United States Patent Office 3,458,499
Patented July 29, 1969

3,458,499
AZEPINE DERIVATIVES
Walter Schindler, Riehen, and Hans Blattner, Basel, Switzerland, assignors to Geigy Chemical Corporation, Greenburgh, N.Y., a corporation of Delaware
No Drawing. Continuation of application Ser. No. 340,119, Jan. 20, 1964. This application Sept. 19, 1966, Ser. No. 580,502
Claims priority, application Switzerland, Jan. 24, 1963, 842/63
Int. Cl. C07d 41/08; A61k 27/00
U.S. Cl. 260—239  4 Claims

ABSTRACT OF THE DISCLOSURE

Compounds of the class of 5H-dibenz[b,f]azepines and 10,11-dihydro-5H-dibenz[b,f]azepines substituted on the heterocyclic nitrogen atom by alkylaminoalkylaminoalkyl. They show anticholinergic activity and catecholamine-potentiation, and can be used as spasmolytics. An illustrative embodiment is 5-[γ-(β'-dimethylamino-ethylamino)-propyl]-10,11-dihydro-5H-bidenz[b,f]azepine.

Detailed disclosure

This is a streamlined continuation of Ser. No. 340,119, filed Jan. 20, 1964.

The present invention concerns new azepine derivatives which have values pharmacological properties as well as processes for the production thereof.

Compounds of the formula

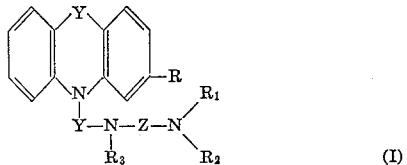

wherein:

X represents the ethylene or vinylene radical, Y and Z represent straight or branched-chain alkylene radicals each having 2 to 4 carbon atoms of which 2 to 3 in each case are in a direct chain between the nitrogen atoms, R represents hydrogen or a chlorine atom, $R_1$ represents a low alkyl radical, $R_2$ represents hydrogen or a low alkyl radical and $R_2$ and $R_3$ together with the nitrogen atom and, when present, an oxygen atom which has two separate linkages or a low alkylimino group or a low hydroxyalkylimino group, also represent a heterocycle, $R_3$ represents hydrogen or a low alkyl radical or, if $R_2$ is not hydrogen, also a phenylalkyl radical having at most 9 carbon atoms, or a cycloalkyl radical having 5 to 6 ring members and at most 8 carbon atoms, and their salts with inorganic and organic acids, have not been known up to now. It has now been found that these compounds have valuable pharmacological properties. They are particularly distinguished by significant anticholinergic activity as well as by catecholamine-potentiation, and can be used as spasmolytics. They can be administered as such or in the form of their salts orally or, in the form of aqueous solutions of their salts, also parenterally.

In the compounds of the general Formula I, Y and Z independently of each other are, e.g. ethylene, propylene, trimethylene, 1-methyl-trimethylene or 2-methyl-trimethylene radicals, $R_1$ can be, for example, the methyl, ethyl, n-propyl isopropyl, n-butyl or isobutyl radical and $R_2$ can be hydrogen or one of the radicals mentioned for $R_1$. In addition $R_1$ and $R_2$ together with the adjacent nitrogen atom can also form a heterocycle, e.g. the 1-pyrrolidinyl, piperidino, hexamethyleneimino, morpholino, 1-piperazinyl, 4-methyl-1-piperazinyl, 4-(β-hydroxyethyl) - 1-piperazinyl, 4 - (β-acetoxyethyl-1-piperazinyl or 4-methyl-1-homopiperazinyl radical. $R_3$ is, for example, hydrogen or the methyl, ethyl, n-propyl, isopropyl, n-butyl, isobutyl, benzyl, α-phenylethyl, β-phenylethyl, α-methyl-β-phenylethyl, γ-phenylpropyl, cyclopentyl, cyclohexyl, a methylcyclohexyl or a dimethylcyclohexyl radical if $R_2$ is not hydrogen. $R_3$ is preferably hydrogen or the same low alkyl radical as $R_1$ if $R_2$ is hydrogen.

To produce the new compounds of the general Formula I, a reactive ester of a compound of the formula

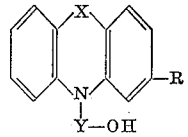

in which R, X and Y have the meanings given above, is reacted with a compound of the general Formula III

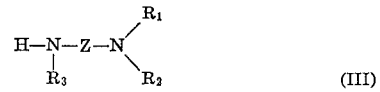

wherein $R_1$, $R_2$ and $R_3$ have the meaning given above. The reaction can be performed in the presence or absence of organic solvents such as, e.g. benzene, toluene or dioxan, at moderately high temperatures, e.g. between about 60 and 120°. Suitable reactive esters of compounds of the general Formula II are, for example, their halides (hydrohalic acid esters), methane sulphonic acid esters and aryl sulphonic acid esters, such as, e.g. p-toluene sulphonic acid ester. Such compounds can be obtained, for example, by condensing 5H-dibenz[b,f]azepine, 3-chloro-5H-dibenz[b,f]azepine, 10,11-dihydro-5H - dibenz[b,f]azepine or 3-chloro-10,11-dihydro-5H-dibenz[b,f]azepine with non-geminal low dihalogenoalkanes, in particular with those having two different halogen atoms such as 1-bromo-3-chloropropane or 1-bromo-2-methyl-3-chloropropane, or condensing them with aryl sulphonic acid halgenoalkyl esters by means of sodium amide or one of the other basic condensing agents mentioned below in an inert organic solvent. They are also obtained by reacting 5H-dibenz[b,f]azepine, 10,11-dihydro-5H-dibenz[b,f]azepine or the corresponding 3-chloro compounds with ethylene oxide and treating the hydroxyethyl compounds obtained with inorganic acid halides, with methane sulphochloride or with an arylsulphonic acid chloride.

Examples of starting materials of the general Formula III are the

N-methyl,
N-ethyl,
N-n-propyl,
N-isopropyl,
N-n-butyl,
N-isobutyl,
N,N-dimethyl,
N,N-diethyl,
N,N'-dimethyl,
N,N'-diethyl,
N,N,N'-trimethyl,
N,N-dimethyl-N'-ethyl,
N,N-diethyl-N'-methyl,
N,N,N'-triethyl,
N,N-dimethyl-N'-n-propyl,
N,N-dimethyl-N'-n-butyl,
N,N-dimethyl-N'-benzyl,
N,N-dimethyl-N'-(β-phenylethyl),
N,N-dimethyl-N'-cyclopentyl,
N,N-dimethyl-N'-cyclohexyl,
N,N-diethyl-N'-benzyl and
N,N-diethyl-N'-cyclohexyl derivatives of ethylenediamine, 1,2-propane-diamine, 1,3-propanediamine, 1-methyl-1,3-propanediamine and 2-methyl-1,3-propanediamine. In the above starting materials, N only symbolises the higher substituted nitrogen atom in comparison with N', without regard to its position in the alkaline chain.

Further starting materials of the general Formula III are, e.g. 1-(β-amino-ethyl)- and 1-(γ-amino-propyl)-pyrrolidine, -piperidine, -hexamethyleneimine, -morpholine, -4-methyl-piperazine and -4-(β-hydroxy-ethyl)-piperazine.

Some of the compounds of the general Formula I are also produced by another process by condensing, in the presence of a basic condensing agent, a compound of the general Formula IV

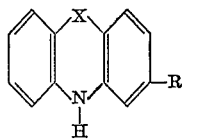

(IV)

wherein R and X have the meanings given above, i.e. condensing 5H-dibenz[b,f]azepine, 10,11-dihydro-5H-dibenz[b,f]azepine or a corresponding 3-chloro compound, with a reactive ester of a compound of the general Formula V

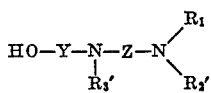

(V)

wherein $R_2'$ represents a low alkyl radical and, together with $R_1$ and possibly an oxygen atom which has two separate linkages or a low alkylimino group, a heterocycle and $R_3'$ represents a radical corresponding to the definition of $R_3$ with the exception of hydrogen, and $R_1$, Y and Z have the meanings given above.

Suitable basic condensing agents are, in particular, the alkali metals and their derivatives such as sodium amide, lithium amide, potassium amide, sodium or potassium, butyl lithium, phenyl lithium or lithium hydride. The reaction is performed in the presence or absence of an inert organic solvent, of which benzene, toluene and xylenes can be named as examples, while heating, e.g. between about 80–140°, i.e. at the boiling temperature of the above solvents.

Examples of reactive esters of compounds of the general Formula V are their halides, particularly the chlorides such as N-(β-chloroethyl)-N,N',N'-trimethylethylenediamine,
N-(γ-chloro-propyl)-N,N',N'-ethylenediamine,
N-(γ-chloropropyl)-N-phenyl-N',N'-dimethyl-ethylenediamine,
N-(γ-chloropropyl)-N-cyclohexyl-N',N'-ethylenediamine,
N-(γ-chloro-β-methyl)-propyl-N,N',N'-trimethylethylenediamine,
N-(β-chloroethyl)-N,N',N'-trimethyl-1,3-propanediamine,
N-(γ-chloropropyl)-N,N',N'-trimethyl-1,3-propanediamine,
N-(γ-chloropropyl-N,N',N'-triethyl-1,3-propanediamine,
N-(γ-chloropropyl)-N,N',N'-2-tetramethyl-1,3-propanediamine,
N-(γ-chloropropyl-N-cyclopentyl-N',N'-dimethyl-1,3-propanediamine and
N-(γ-chloropropyl-N,N',N'-trimethyl-1,2-propanediamine and the corresponding bromides and iodides as well as the corresponding methane sulphonic acid esters and aryl sulphonic acid esters also. These reactive esters can be produced, for example, by reacting ethylenediamine tri- substituted corresponding to the definition of $R_1$, $R_2'$ and $R_3'$ or other alkanediamines compatible with the definition of Z, with ethylene oxide or other vicinal epoxyalkanes containing at most 4 carbon atoms, or reacting them with reactive monoesters of alkane diols containing at most 4 carbon atoms such as chloroalkanols, bromoalkanols, methane sulphonoloxy alkanols and p-toluene sulphonyloxy alkanols, and treating the N,N',N'-trisubstituted N-hydroxyalkyl alkanediamines obtained, after converting them into their hydrohalides, with inorganic acid halides such as, e.g. thionyl chloride or with methane sulphochloride or p-toluene sulphochloride.

According to a third process the compounds of the general Formula I are produced by reacting a compound of the general Formula VI,

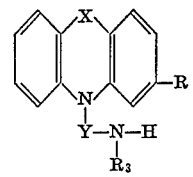

(VI)

in which X, Y, R and $R_3$ have the meaning given above, with a reactive ester of a compound of the general formula

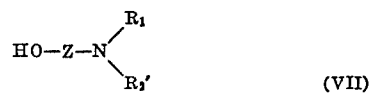

(VII)

in which $R_1$, Z and $R_2'$ have the meanings given for the general Formulae I and V.

The reaction is performed preferably in an inert organic solvent under the conditions described in the previous process and in the presence of butyl lithium, sodium amide or with one of the other basic condensing agents mentioned in the previous process, with which possibly the starting material of the general Formula VI is at once converted into its alkali metal compound. Many of the starting materials of the general Formula VI such as, e.g.

5-(β-methylamino-ethyl)-10,11-dihydro-5H-dibenz[b,f]azepine,
5-(β-methylamino-ethyl)-5H-dibenz[b,f]azepine,
5-(γ-methylamino-propyl)-10,11-dihydro-5H-dibenz[b,f]azepine,
5-(γ-methylamino-propyl-5H-dibenz[b,f]azepine,
5-(γ-methylamino-β-methyl-propyl)-10,11-dihydro-5H-dibenz[b,f]azepine,
5-(γ-methylamino-β-methyl-propyl)-5H-dibenz[b,f]azepine,
3-chloro-5-(γ-methylamino-propyl)-10,11-dihydro-5H-dibenz[b,f]azepine, and
5-(γ-amino-propyl)-10,11-dihydro-5H-dibenz[b,f]azepine, are already known and others can be preared, if desired, in the same way as the known compounds. This also applies to the reactive esters of compounds of the general Formula VII, of which the halides, in particular chlorides such as β-dimethylamino-ethyl chloride, β-diethylamino-ethyl chloride, β-(1-pyrrolidinyl)-ethyl chloride, β-piperidino-ethyl chloride, β-morpholino-ethyl chloride, γ-dimethylamino-propyl chloride, γ-dimethylamino-β-methyl-propyl chloride and γ-(4-methyl-1-piperazinyl)-propyl chloride, as well as the corresponding bromides and p-toluene sulphonic acid esters, are suitable as starting materials.

The new compounds of the general Formula I form mono-acid, di-acid and, if $R_1$ and $R_2$ together with a low alkylimino group or a hydroxyalkylimino group, form a heterocycle, also tri-acid salts, some of which are water soluble, with inorganic and organic acids such as hydrochloric acid, hydrobromic acid, sulphuric acid, phosphoric acid, methane sulphonic acid, ethane disulphonic acid, β-hydroxyethane sulphonic acid, acetic acid, lactic acid, oxalic acid, succinic acid, fumaric acid, maleic acid, malic acid, tartaric acid, citric acid, benzoic acid, salicylic acid, phenylacetic acid and mandelic acid.

Pharmaceutically acceptable salts, i.e. salts with acids which in the necessary dosages are pharmacologically harmless can be used direct as active substances for pharmaceuticals for oral or parenteral administration. Salts with other acids are suitable for example, for recrystallization purposes in order to isolate and purify the new compounds.

The following examples illustrate the production of the new compounds of the general Formula I according to the invention but are by no means the only methods of performing the same. The temperatures are in degrees centigrade.

Example 1

15 of 5-($\gamma$-chloropropyl)-10,11-dihydro-5H - dibenz[b,f]azepine and 13 g. of N,N-diethyl-ethylenediamine are heated for 3 hours on a boiling water bath. After cooling, ether and water are added to the reaction mixture, after shaking well, the ethereal phase is removed and washed several times with water. The ethereal phase is then extracted three times with 2 N hydrochloric acid. The combined hydrochloric acid extracts are made alkaline with concentrated ammonia and the base which separates is taken up in ether. The ether solution is dried with potassium carbonate and evaporated and the residue is distilled under high vacuum. The 5-[$\gamma$-($\beta'$-diethylamino-ethylamino)-propyl]-10,11-dihydro-5H - dibenz[b,f]azepine passes over at 175–177° under 0.05 mm. pressure. The dihydrochloride prepared with ethanolic hydrochloric acid melts at 245–247°.

The following compounds are obtained in an analogous manner using the equivalent amount of correspondingly substituted ethylene diamines or 1,3-propane diamines:

5-[$\gamma$-($\beta'$-dimethylamino-ethylamino)-propyl-10,11-dihydro-5H-dibenz[b,f]azepine, B.P. $_{0.005}$ 184°, dihydrochloride M.P. 245–247°, 5-[$\gamma$-(N-ethyl-$\beta'$-diethylamino-ethylamino)-propyl]-10,11-dihydro-5H-dibenz[b,f]azepine, B.P.$_{0.007}$ 185°, dihydrochloride M.P. 177–179°, 5-[$\gamma$-(N-methyl-$\beta'$-dimethylamino-ethylamino)-propyl]-5H-dibenz[b,f]azepine, B.P.$_{0.015}$ 170°, 5-[$\gamma$-(N-cyclohexyl-$\beta'$-dimethylamino-ethylamino)-propyl]-10,11-dihydro-5H-dibenz[b,f]azepine, B.P.$_{0.01}$ 206°, and 5-[$\gamma$-($\gamma'$-dimethylamino-propylamino)-propyl]-10,11-dihydro-5H-dibenz[b,f]azepine, B.P.$_{0.008}$ 172°, dihydrochloride 235–238°.

Also, on using 5-($\gamma$-chloropropyl)-5H-dibenz[b,f]azepine and the correspondingly substituted ethylenediamines or 1,3-propane diamines, the following compounds are obtained in an analogous manner:

5-[$\gamma$-($\beta'$-diethylamino-ethylamino)-propyl]-5H-dibenz[b,f] azepine, B.P.$_{0.01}$ 192°, dihydrochloride M.P. 213–215°, 5-[$\gamma$-($\beta'$-dimethylamino-ethylamino)-propyl]-5H-dibenz[b,f] azepine, B.P.$_{0.01}$ 177°, dihydrochloride, M.P. 225–226°, 5-[$\gamma$-(N-benzyl-$\beta'$-dimethylamino-ethylamino)-propyl]-5H-dibenz[b,f]azepine, B.P.$_{0.08}$ 215°, dihydrochloride, M.P. 155–160°, and 5-[$\gamma$-($\gamma'$-dimethylamino-propylamino)-propyl]-5H-dibenz[b,f] azepine, B.P.$_{0.006}$ 177°, dihydrochloride, M.P. 175–176°.

In an analogous manner on using 5-($\gamma$-chloro-$\beta$-methyl-propyl)-10,11-dihydro-5H-dibenz[b,f]azepine and N,N-dimethyl-ethylenediamine, N,N-diethyl-ethylenediamine or N,N-dimethyl-1,3-propane diamine, are obtained:

5-[$\gamma$-($\beta'$-dimethylamino-ethylamino)-$\beta$-methyl-propyl]-10,11-dihydro-5H-dibenz[b,f]azepine, 5-[$\gamma$-($\beta'$-diethylamino-ethylamino)-$\beta$-methyl-propyl]-10,11-dihydro-5H-dibenz[b,f]azepine, or 5-[$\gamma$-($\gamma'$-dimethylamino-propylamino)-$\beta$-methyl-propyl]-10,11-dihydro-5H-dibenz[b,f]azepine;

on using 5-($\gamma$-chloro-$\beta$-methyl-propyl)-5H-dibenz[b,f]azepine and the three diamines mentioned above are obtained:

5-[$\gamma$-($\beta'$-dimethylamino-ethylamino)-$\beta$-methyl-propyl]-5H-dibenz[b,f]azepine, 5-[$\gamma$-($\beta'$-diethylamino-ethylamino)-$\beta$-methyl-propyl]-5H-dibenz[b,f]azepine, or 5-[$\gamma$-($\gamma'$-dimethylamino-propylamino]-$\beta$-methyl-propyl]-5H-dibenz[b,f]azepine;

on using 3-chloro-5-($\gamma$-chloropropyl)-10,11-dihydro-5H-dibenz[b,f]azepine and the three diamines above mentioned are obtained:

3-chloro-5-[$\gamma$-($\beta'$-dimethylamino-ethylamino)-propyl]-10,11-dihydro-5H-dibenz[b,f]azepine, 3-chloro-5-[$\gamma$-($\beta'$-diethylamino-ethylamino)-propyl]-10,11-dihydro-5H-dibenz[b,f]azepine, or 3-chloro-5-[$\gamma$-($\gamma'$-dimethylamino-propylamino)-propyl]-10,11-dihydro-5H-dibenz[b,f]azepine;

and on using 3-chloro-5-($\gamma$-chloropropyl)-5H-dibenz[b,f] azepine and the three diamines above mentioned, are obtained:

3-chloro-5-[$\gamma$-($\beta'$-dimethylamino-ethylamino)-propyl]-5H-dibenz[b,f]azepine, 3-chloro-5-[$\gamma$-($\beta'$-diethylamino-ethylamino)-propyl]-5H-dizenz[b,f]azepine, and 3-chloro-5-[$\gamma$-($\gamma'$-dimethylamino-propylamino)-propyl]-5H-dibenz[b,f]azepine.

Example 2

A suspension of 4 g. of sodium amide in abs. toluene is added dropwise slowly at 50° while stirring to a solution of 19.5 g. of 5H-dibenz[b,f]azepine and 16 g. of N-($\gamma$-chloro-propyl)-N,N',N'-trimethyl-ethylenediamine in 200 ml. of abs. toluene. The reaction mixture is then refluxed for 14 hours while stirring. After cooling, water is added, the toluene phase is removed and extracted several times with 2 N hydrochloric acid. The combined hydrochloric acid extracts are made alkaline with concentrated ammonia and the precipitated base is taken up in ether. After drying the ether solution with potassium carbonate and evaporating, the residue is distilled under high vacuum whereupon 5-[$\gamma$-(N-methyl - $\beta'$ - dimethylamino - ethylamino) - propyl] - 5H - dibenz[b,f]azepine is obtained, B.P.$_{0.015}$ 170°.

5-[$\gamma$-(N-ethyl-$\beta'$-diethylamino - ethylamino) - propyl]-10,11-dihydro-5H-dibenz[b,f]azepine (B.P.$_{0.007}$ 185°, dihydrochloride M.P. 177–179°), 5-[$\beta$-(N-methyl-$\beta'$-dimethyamino-ethyamino)-ethyl]-10,11 - dihydro - 5H - dibenz[b,f]azepine and 5-[$\beta$-(N-ethyl-$\beta'$-diethylamino-ethylamino)-ethyl]-10,11-dihydro-5H-dibenz[b,f]azepine are obtained in an analogous manner.

Example 3

26.6 g. of 5-($\gamma$-methylamino-propyl)-10,11-dihydro-5H-dibenz[b,f]azepine are dissolved in 140 ml. of absolute toluene and added at room temperature to 7.7 g. of butyl lithium (20% excess) in the form of a 20% suspension in hexane. A solid yellow substance immediately precipitates and the temperature rises to approximately 60–65° with development of gas. The mixture is heated for 1½ hours to 80° and 12.2 g. of $\gamma$-dimethylamino-propyl chloride in 50 ml. of toluene (base liberated from the hydrochloride under toluene by means of sodium hydroxide solution) are then added dropwise at the same temperature. The reaction mixture is then refluxed for approximately 14 hours and 50 ml. of ice-cold water are added after cooling to approx. 0–5°. The organic phase is separated and extracted with 2 H hydrochloric acid. The extract is made alkaline with 2 N sodium hydroxide solution and then extracted with ether. The ether extract is dried over sodium sulphate and evaporated, and the residue is distilled in high vacuum. The 5-[γ-(N-methyl-γ'-dimethylamino-propyl-amino)-propyl]-10,11-dihydro - 5H-dibenz[b,f]azepine passes over between 160–180° and under 0.001 pressure.

The distillate is converted into the dihydrochloride of the base by means of ethanolic hydrochloric acid. The latter melts at 241–243° after recrystallising twice from ethanol.

In an analogous manner are obtained by using 17.7 g. of γ-(4-methyl-1-piperazinyl)-propyl chloride, the 5-{γ-[N - methyl-γ-(4'-methyl-1'-piperazinyl) - propylamino]-propyl}-10,11-dihydro-5H-dibenz[b,f]azepine, and by using 13.6 g. of γ-dimethylamino-β-methyl-propyl chloride, the 5-[γ-(N,β'-dimethyl-γ'-dimethylamino-propylamino)-propyl]-10,11-dihydro-5H-dibenz[b,f]azepine.

We claim:
1. A compound of the formula

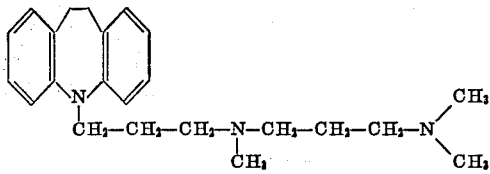

2. A compound of the formula

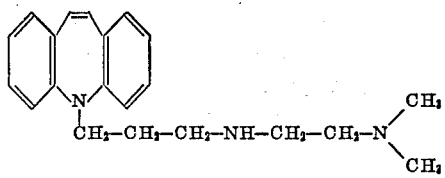

3. A compound of the formula

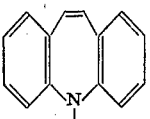

4. A compound of the formula

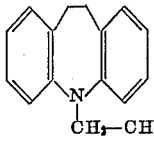

References Cited

UNITED STATES PATENTS 2,674,596  4/1954  Hafliger et al.
2,948,719  8/1960  Schindler et al.
2,976,281  3/1961  Schindler et al.
3,074,931  1/1963  Craig.

OTHER REFERENCES

Schindler et al.: III, Helv. Chem. Acta, vol. 37, pages 472–483 (1954), 20 1 H4.

ALTON D. ROLLINS, Primary Examiner

U.S. Cl. X.R.

260—247.1, 247.5, 268, 293, 293.4, 294.7, 326.5, 326.8, 326.81, 326.82; 424—244